J. W. DORRIS.
SPRAYING MACHINE.
APPLICATION FILED MAR. 7, 1916.

1,287,578.

Patented Dec. 10, 1918.
3 SHEETS—SHEET 1.

Inventor
J. W. Dorris.

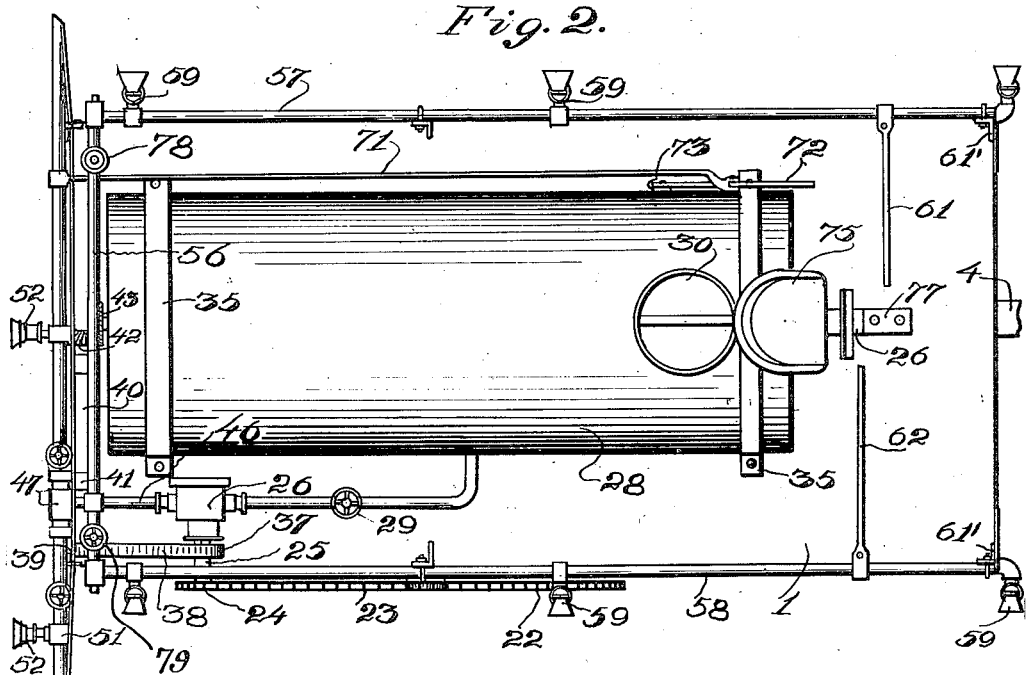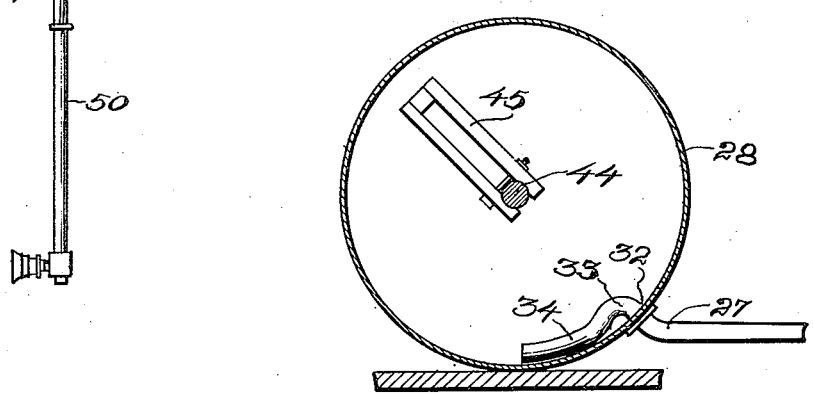

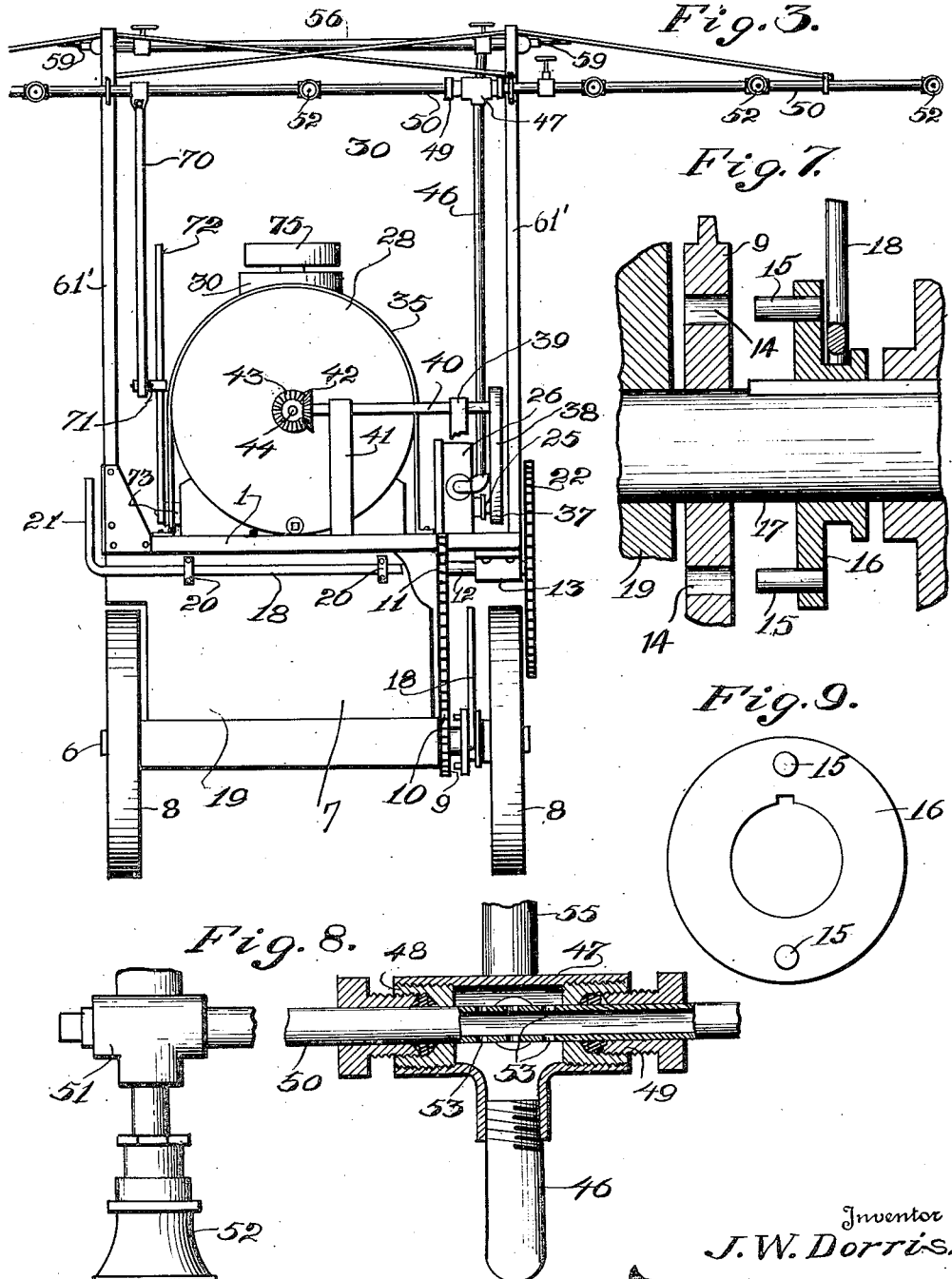

UNITED STATES PATENT OFFICE.

JAMES W. DORRIS, OF SULLIVAN, INDIANA.

SPRAYING-MACHINE.

1,287,578.  Specification of Letters Patent.  Patented Dec. 10, 1918.

Application filed March 7, 1916. Serial No. 82,700.

*To all whom it may concern:*

Be it known that I, JAMES W. DORRIS, a citizen of the United States, residing at Sullivan, in the county of Sullivan and State of Indiana, have invented certain new and useful Improvements in Spraying-Machines; and I do hereby declare the following to be a full, clear, and exact description of the invention, such as will enable others skilled in the art to which it appertains to make and use the same.

This invention relates to machines utilized for spraying various types of liquid, such as are used for killing insect life upon trees, plants or flowers, or which may be used for sprinkling, if so desired.

The primary object of the invention is to provide a spraying machine, as specified, which has a plurality of nozzles arranged along the sides of the same and across the rear end of the truck body of the sprayer.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Fig. 2 is a top plan view of the improved sprinkler,

Fig. 3 is a rear elevation,

Fig. 4 is a cross section through the liquid retaining tank,

Figure 1:
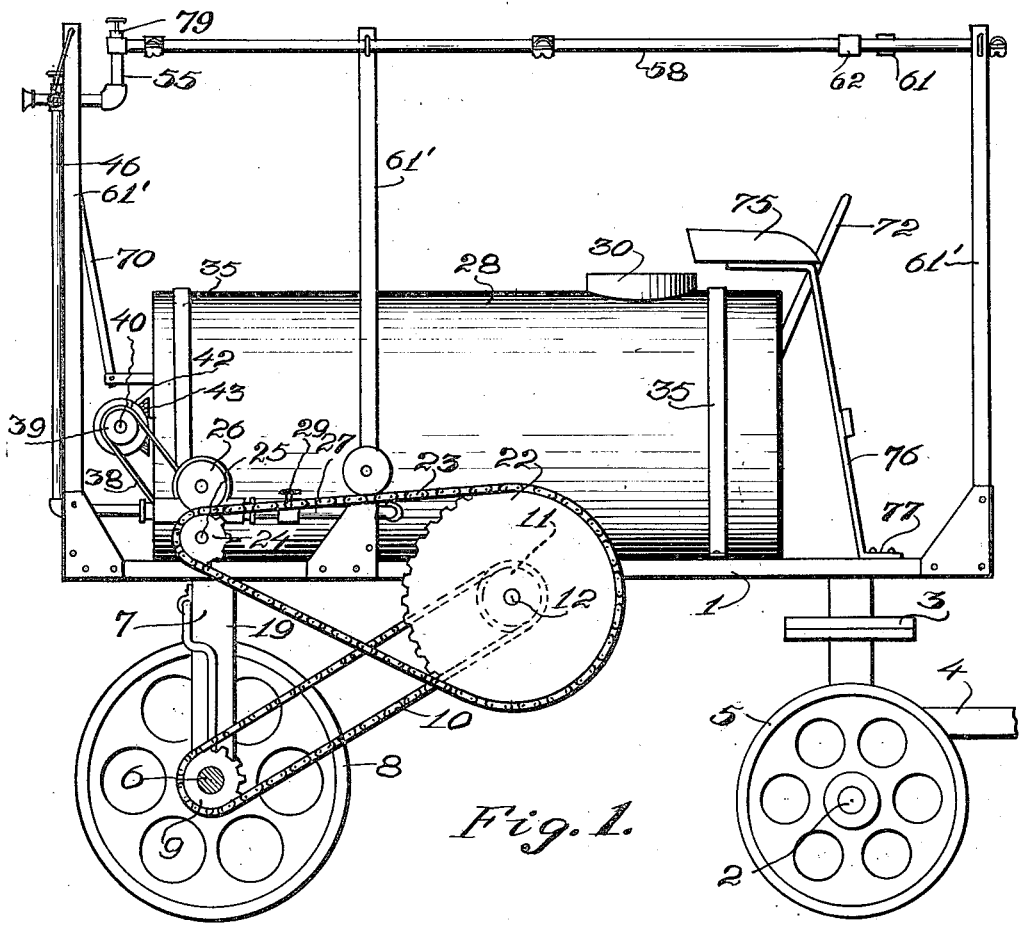
Figure 1 is a side elevation of the improved sprinkler.
Figure 5:
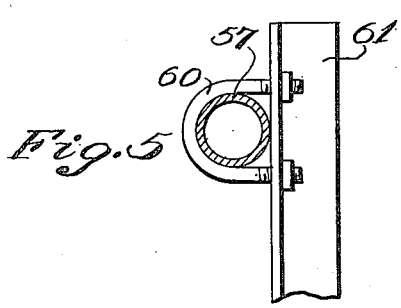
Figure 6:
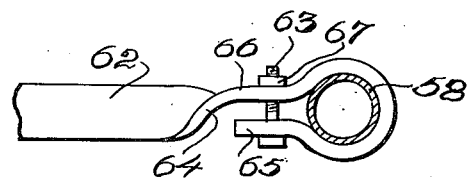

Fig. 5 is a fragmentary view, showing the manner of rotatably supporting the liquid supply pipe for the nozzles, Fig. 6 is a sectional view through one of the supply pipes for the nozzles, showing the lever used for rocking the pipe attached thereto, Fig. 7 is a detail view of the clutch mechanism, Fig. 8 is a sectional view through a part of the liquid distributing structure of the sprayer, and Fig. 9 is a detail view of a part of the clutch structure.

Referring more particularly to the drawings, 1 designates the base or platform of the sprinkler or sprayer, which has a front axle 2 connected thereto, through the medium of a fifth wheel structure 3. A tongue 4, of any ordinary construction, is connected to the axle 2, and is provided for hitching draft animals to the sprayer. The front axle 2 has traction wheels 5, mounted thereupon. A rear axle 6 is supported beneath the body 1 of the sprayer, by suitable supporting structure 7, and it has traction wheels 8 mounted thereon.

The axle 6 has a sprocket 9 rotatably mounted thereon, about which a sprocket chain 10 travels. The sprocket chain 10 travels about a sprocket 11, which is mounted upon a stub shaft 12. The stub shaft 12 is rotatably supported by a bearing box or hanger 13. The sprocket 10 is loosely mounted upon the axle 6, and is provided with a plurality of openings 14, extending therethrough. The openings 14 are provided for receiving pins 15, which are formed upon one face of a clutch disk 16. The clutch disk 16 is slidably mounted upon an extended hub 17 formed upon the rear traction wheel 8 and it is moved longitudinally thereon, by the shifting of a lever 18, which is slidably carried by the bolster 19 at the rear end of the conveyer. The lever 18 extends entirely across the bolster 19, and is slidably supported by suitable brackets 20. The lever 18 has the end remote from the clutch disk 16, bent upwardly, as is shown at 21, to provide a handle by means of which the lever is shifted for shifting the clutch disk.

The stub shaft 12 has a sprocket 22 mounted thereon, which is greater in size than the sprocket 11. A sprocket chain 23 travels about the sprocket 22 and about a sprocket 24, which is smaller in diameter than the sprocket 22, and which is mounted upon the central propelling shaft 25 of the pump structure 26. The pump structure 26 may be of any ordinary rotary pump construction, and it has a pipe 27 communicating therewith. The pipe 27 enters the liquid retaining tank 28, which is carried by the upper face of the platform 1. The pipe 27 has a valve 29 interposed therein, for cutting off the communication through the pipe between the pump and the tank, when it is so desired.

The tank 28 has an inlet 30 formed thereon adjacent its forward end, and it is further provided with an opening 32 formed in one side of the same adjacent to its lowermost portion. The pipe 27 extends through the opening 32, and is connected thereto in a fluid-tight connection, so as to prevent the leakage of the liquid from the tank through the opening 32 around the pipe 27. The pipe 27 is provided with a hump 33 immediately after it enters the tank 28, and its end 34 is curved to conform to the curvature of the inner walls of the tank. The curved end 34 lies flat upon the inner surface of the lowermost portion of the tank 28, and it has its open end communicating with substantially the center of the lower portion of the tank, as is clearly shown in Fig. 4 of the drawings. Suitable straps 35 may be employed for attaching the tank 28 to the truck structure of the spraying machine.

The shaft 25 has a pulley 37 mounted thereon, about which a belt 38 travels. The belt 38 also travels about the pulley 39, which is mounted upon a shaft 40. The shaft 40 is rotatably supported by suitable brackets 41 and it extends across the rear end of the tank 28. A beveled gear 42 is mounted upon the end of the shaft 40 remote from the pulley 39, and it meshes with a beveled gear 43, which is carried by a shaft 44. The shaft 44 extends longitudinally through the center of the tank 28, and has agitators 45 mounted thereon, which are provided for agitating the liquid contained within the tank.

The outlet end of the pump structure 26, has a pipe 46 communicating therewith, which pipe is connected to and has communication with a coupling 47 having a side outlet. The coupling 47 has stuffing boxes 48 and 49 mounted in its alining open ends, which stuffing boxes rotatably support a length of pipe 50. The length of pipe 50 has T-connections 51 interposed therein, to which are attached spraying nozzles 52 of any suitable type. The portion of the pipe 50, which extends through the coupling 47, is provided with a plurality of openings 53 through which the liquid enters for passage through the pipe 50 and the nozzles 52.

The ends of the pipe 50 have plugged T-joints mounted thereon, to which nozzles 52 are attached, so that the length of the pipe may be increased if it is so desired. However, if it is desired, the ends of the pipes may have L's mounted thereon, this feature being left to the discretion of the person manufacturing the sprayer.

The side outlet of the coupling 47 has a pipe 55 communicating therewith, which extends upwardly and communicates with a pipe 56, which extends transversely across the rear end of the truck 1 of the sprayer. The pipe 56 has pipes 57 and 58 communicating therewith, which extend longitudinally along the sides of the truck, and have spraying nozzles 59 secured thereto at spaced intervals along their lengths. The pipes 56, 57, 58 and the pipe 50 are rotatably supported by straps 60 which encompass or extend about the pipes and are connected to vertical standards 61'. The standards 61' are preferably constructed of angle iron, but any desired material may be employed.

The pipes 57 and 58 have handles 61 and 62 respectively, connected thereto, which handles are held in engagement with the pipes, for rotating them, by means of bolts 63. The levers 61 and 62 are made preferably of flat metal and each is twisted adjacent to that end which is attached to the pipe 57 or 58, as is shown at 64. The end of the lever which extends outwardly from the twisted section 64 is curved, so as to fit about the pipe, and the terminal 65 is positioned parallel to a section 66 of the lever which is placed intermediate the twist 64 and the curved portion. The bolt 63 extends through the parallel portions 65 and 66, so that when the nut 67 is tightened upon the bolt, these parallel portions will be drawn toward each other and securely bind the curved portion of the handle upon the respective pipe.

The length of pipe 50 has an arm 70 connected thereto, which arm extends downwardly and has its lower end connected to a bar or rod 71. The rod 71 extends longitudinally along the tank 28, and has its forward end connected to a lever 72. The lever 72 is pivotally connected to a suitable bracket 73, which is carried by the truck platform 1. By swinging the lever 72, the section of pipe 50 may be rotated or rocked for changing the angle of the nozzles 52, for regulating the direction in which the water will flow upon being forced out of the nozzles. The levers 61 and 62 are provided for rocking the lengths 57 and 58 of pipe for varying the angle at which the nozzles 59 extend, for regulating the direction of flow of the liquid flowing therefrom.

A seat 75 is supported by an ordinary seat supporting standard 76, which has its lower end connected to the platform 1, as shown at 77.

The pipe 56 has valves 78 and 79 interposed therein, which control the passage of the liquid into the pipes 57 and 58 respectively, whereby the flow of the liquid may be cut off from either of the pipes or both of them, as desired.

In the operation of the improved sprayer:

The tank 28 is first filled with any suitable type of disinfecting or spraying liquid, and the machine or sprayer is driven to the plants or trees to be sprayed, after which the lever 18 is operated for throwing the clutch 16 into operative connection with the sprocket 9, which will rotate the pump 26, and draw the liquid out of the tank into the pump and force it out of the pump through the various pipes feeding the liquid to the spraying nozzles. The flow of the liquid into and through the pump may be regulated by shutting off the valve 29, or if it is desired, the flow of the liquid through either of the pipes 57 or 58 may be regulated by the regulation of the valves 78 and 79. Any suitable type of spraying nozzles may be employed without departing from the spirit of this invention.

From the foregoing description taken in connection with the accompanying drawings the advantages of construction and of the method of operation of the improved spraying machine will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a spraying machine, the combination with a tank, a pump structure connected to the tank, a pair of longitudinally extending pipes supported above said tank, spaced nozzles on each of said pipes, a transverse pipe connecting the rear ends of said longitudinal pipes, a second transverse pipe positioned a short distance below said first transverse pipe and projecting laterally upon each side of the spraying machine, said projecting ends each provided with nozzles, a pipe connecting said pump and said last named transverse pipe, a pipe connection between said transverse pipes whereby liquid may be forced by the pump through the said transverse pipes and said longitudinal pipes, and valves arranged in said pipes whereby the flow of liquid may be shut off from the respective projecting ends of the second transverse pipe, or from either or both of the said longitudinal pipes without otherwise affecting the flow through the several pipes.

In testimony whereof I affix my signature in presence of two witnesses.

JAMES W. DORRIS.

Witnesses:
    CHARLES D. HUNT,
    LILLIE GOODMAN.